United States Patent [19]
DeLoach

[11] Patent Number: 5,256,379
[45] Date of Patent: Oct. 26, 1993

[54] APPARATUS AND METHOD FOR REMOVING HYDROCARBONS FROM AIRSTREAM

[76] Inventor: Anthony DeLoach, 1630 Jewel Ave., Sarasota, Fla. 34240

[21] Appl. No.: 812,420

[22] Filed: Dec. 23, 1991

[51] Int. Cl.$^5$ .............................................. B01J 19/12
[52] U.S. Cl. ................................. 422/186.3; 204/176; 210/748
[58] Field of Search ............... 422/186.3, 187, 188, 422/189; 204/176; 210/748, 759, 760

[56] References Cited

U.S. PATENT DOCUMENTS

| | | | |
|---|---|---|---|
| 3,977,952 | 8/1976 | Knowvenagel et al. | 204/157.1 R |
| 4,793,931 | 12/1988 | Stevens et al. | 210/636 |
| 4,882,021 | 11/1989 | Barnhart | 204/157.15 |
| 4,949,114 | 7/1989 | Zeff et al. | 210/747 |
| 5,045,288 | 9/1991 | Raupp et al. | 422/186.3 |

OTHER PUBLICATIONS

McCabe et al., Unit Operations of Chemical Engineering, McGraw-Hill Book Co., 3rd. ed.

*Primary Examiner*—Donald P. Walsh
*Assistant Examiner*—Daniel Jenkins
*Attorney, Agent, or Firm*—Charles J. Prescott

[57] ABSTRACT

An apparatus and method for removing hydrocarbon contaminants from a contaminated airstream flowing into a chamber in the presence of an atomized reagent such as hydrogen peroxide and/or ozone and an ultraviolet light source.

13 Claims, 4 Drawing Sheets

APPARATUS AND METHOD FOR REMOVING HYDROCARBONS FROM AIRSTREAM

BACKGROUND OF THE INVENTION

This invention relates generally to the treatment of hydrocarbon-contaminated mediums, and more particularly to an apparatus and method for removing hydrocarbons from a contaminated airstream by chemical interaction with a reagent such as hydrogen peroxide and/or ozone in the presence of ultraviolet light.

The use of hydrogen peroxide and/or ozone in the presence of an ultraviolet light source to chemically decontaminate and remove hydrocarbon constituents from a contaminated water stream is well known. The following devices are known to applicant to accomplish this purpose:

| | |
|---|---|
| Wiest | 4,156,652 |
| Coviello | 4,179,616 |
| Zeff | 4,792,407 |
| Zeff | 4,849,114 |
| Peterson | 4,897,246 |
| Peterson | 4,952,376 |
| Hager | 5,037,618 |

Applicant is also aware of the U.S. Pat. No. 3,845,317 to Lindwall which is directed to a device for chlorinating saturated hydrocarbons in an aqueous medium, aided by exposure to a reaction-initiating light.

Zeff in U.S. Pat. No. 4,780,207 also discloses an apparatus for decomposition of volatile organic halogenated compounds contained within an airstream by passing that airstream through a porous bed of silica gel and thereafter irradiating the stream of gas with ultraviolet light.

A method and apparatus for soil remediation is disclosed in U.S. Pat. No. 4,978,508 to Hansen et al. which teaches decontaminating soil containing hydrocarbons by first mixing the soil with water and a surfactant to form a slurry which is then screened and reacted with ozone and ultraviolet radiation.

The present invention discloses an apparatus and method for removing hydrocarbon constituents from an airstream within a chamber by introducing into the airstream an atomized vapor of air pressurized hydrogen peroxide and/or ozone in the presence of an ultraviolet light source.

BRIEF SUMMARY OF THE INVENTION

This invention is directed to an apparatus and method for removing hydrocarbon contaminants from a contaminated airstream flowing into a chamber in the presence of a, preferably, air pressure-atomized reagent (oxidizing agent) such as hydrogen peroxide and/or ozone and an ultraviolet light source.

It is therefore an object of this invention to provide an apparatus for removing hydrocarbon constituents from an airstream by exposure within a chamber to an atomized reagent such as hydrogen peroxide and/or ozone in the presence of ultraviolet light.

It is yet another object of this invention to provide a method of removing hydrocarbon constituents from an airstream by exposure within a chamber to an atomized reagent such as hydrogen peroxide and/or ozone in the presence of ultraviolet light.

In accordance with these and other objects which will become apparent hereinafter, the instant invention will now be described with reference to the accompanying drawings.

DETAILED DESCRIPTION OF THE INVENTION

Figure 1:
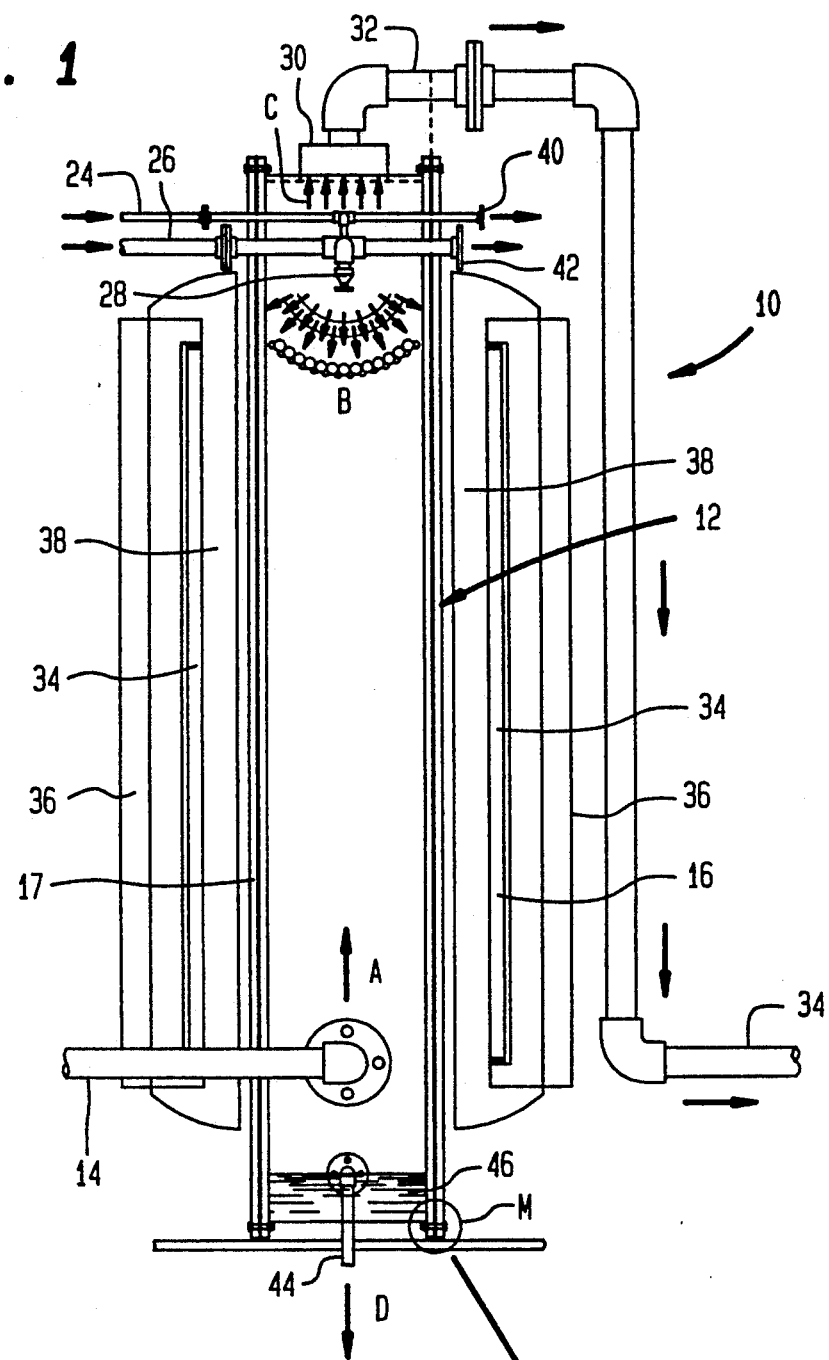
FIG. 1 is a side elevation schematic view of one embodiment of the invention.
Figure 2:
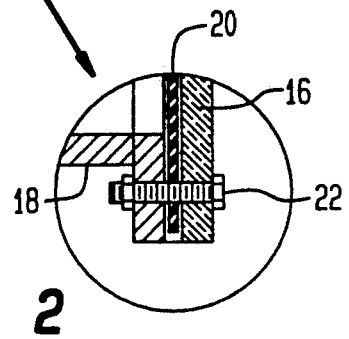
FIG. 2 is an enlargement of region M in FIG. 1.

Referring now to the drawings, and particularly to FIGS. 1 and 2, one embodiment of the invention is there shown generally at numeral 10 and includes a mixing chamber 12 having a contaminated airstream inlet 14 which conveys a hydrocarbon contaminated airstream into the chamber 12 and upward therewithin in the direction of arrow A.

The apparatus 10 also includes a compressed air supply (not shown) flowing through conduit 24 in fluid communication with an atomizing nozzle 28. A separate supply conduit 26 conveys a liquid oxidizing agent such as hydrogen peroxide ($H_2O_2$) and/or ozone ($O_2$) into fluid communication within atomizing nozzle 28.

The compressed air supply pressure may be up to approximately 100 p.s.i., while the flow rate of the contaminated airstream into conduit 28 is maintained at any convenient rate such as 50 to 100 c.f.m.

The compressed air supply flowing into the atomizing nozzle 28 through conduit 24 is mixed with the liquid oxidizing agent flowing into the atomizing nozzle 28 through conduit 26 so that an atomized spray containing atomized particles of the liquid oxidizing agent discharges from atomizing nozzle 28 in the direction of arrow B within chamber 12.

The chamber 12 includes transparent panels 16 and 17 which are bolted to the metal tank flange 18 by bolts 22 (typ.). A gasket seal 20 is provided around the perimeter of these transparent panels 16 and 17 to maintain the sealed condition within chamber 12.

Positioned immediately outside and adjacent these transparent panels 16 and 17 are lighting fixtures 36 which operably support ultraviolet light sources 34. Shields 38 which facilitate directing ultraviolet light through these transparent panels 16 and 17 into chamber 12 are also provided.

By this arrangement, then, the contaminated airstream flowing upward in the direction of arrow A continuously mixes with and becomes saturated by the atomized oxidizing agent flowing into the chamber in the direction of arrow B, the entire blended mixture then being exposed to ultraviolet light. The mixture within the chamber 12, now saturated with the atomized oxidizing agent, results in the breaking down of the hydrocarbons contained within the contaminated airstream to liberate carbon dioxide ($CO_2$) and water ($H_2$). Purified air then exists the chamber 12 in the direction of arrow C through a demister/vapor separator 30, then through conduit 32 and finally discharging through clean air outlet 34.

The remaining liquid oxidizing agent within chamber 12 then collects at the bottom of the chamber at 46 for recollection through drain 44 in the direction of arrow D into a suitable chemical reservoir or tank (not shown) for recycling into the apparatus 10.

The typical range of ultraviolet light preferred is from about 180 to 400 nm. The performance of this apparatus 10 is somewhat controlled by the power level of ultraviolet light sources 34, which may be in the range of 60 to 120 watts. However, higher radiation levels may be used.

As will be described herebelow, one arrangement for increasing the level of hydrocarbon removal from the contaminated airstream is to couple in seriatim a plurality of such apparatus 10, in which case the pressurized airstream may be connected at 40 to the next adjacent unit, while the liquid oxidizing agent may be supplied through coupling 42 thereto. A plurality of atomizing nozzles may also be provided for increased decontamination.

It is here noted that the contaminated airstream entering into this apparatus 10 through conduit 14 may be derived or obtained by extracting a contaminated airstream from a soil vapor extraction system or an air stripping tower or the like which results in the removal of hydrocarbons from either contaminated soil or ground water. However, other sources of combining hydrocarbons with an uncontaminated airstream are envisioned and within the scope of this invention.

Figure 3:
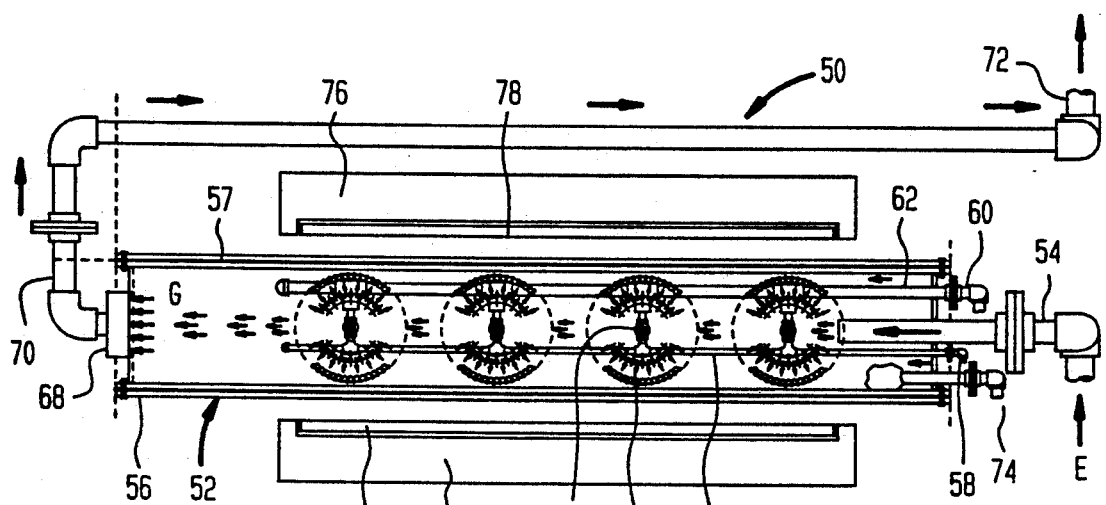
FIG. 3 is a top plan schematic view of another embodiment of the invention.
Figure 4:
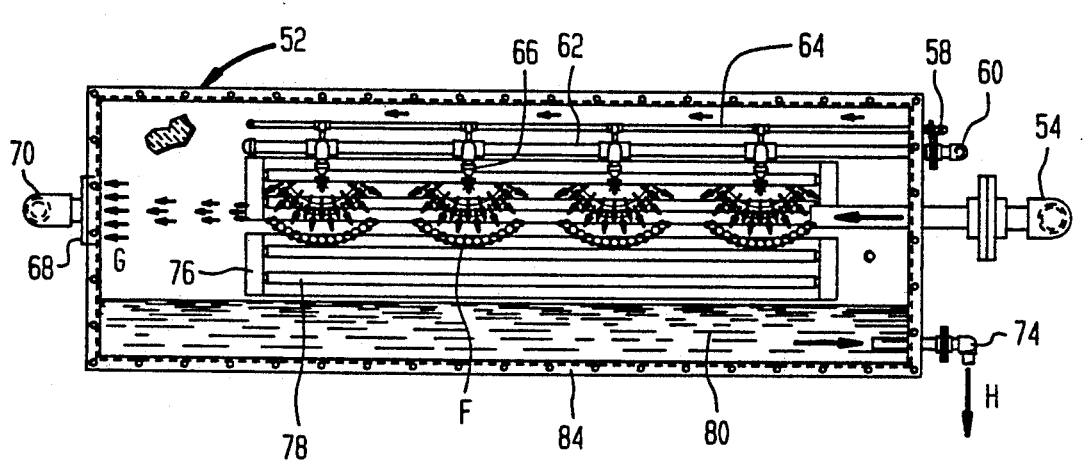
FIG. 4 is a side elevation view of FIG. 3.

Referring now to FIGS. 3 and 4, another embodiment of the present invention is there shown generally at numeral 50 and includes a horizontal mixing chamber 52 having transparent panels 56 and 57 immediately outside and adjacent to which are lighting fixtures 76 operably supporting ultraviolet light sources 78. The contaminated airstream enters chamber 52 in the direction of arrow E through conduit 54. A plurality of atomizing nozzles 66 are shown connected in series or seriatim, being supplied with a continuous source of compressed air through conduit 58 and a source of pressurized liquid oxidizing agent through conduit 50. Mixing and atomizing of the compressed air and liquid oxidizing agent within atomizing nozzle 66 is as previously described. Although air-pressurized nozzles are preferred, pressurized oxidizing agent alone into the vaporizing nozzle 66 may also be utilized.

By this arrangement, a stream of hydrocarbon-contaminated air is made to pass longitudinally through chamber 52, mixing with the atomized oxidizing agent discharging through atomizing nozzles 66 in the direction of arrow F, the saturated mixture being simultaneously exposed to ultraviolet light emanating from light sources 78. The purified airstream then flows out of the chamber in the direction of arrow G through a demister/vapor separator 68, into conduit 70 and then for discharge as clean air through conduit 72.

Excess remaining liquid oxidizing agent is then collected by gravity at 80 for discharge through drain 74 into the oxidizing agent reservoir (not shown).

Figure 5:
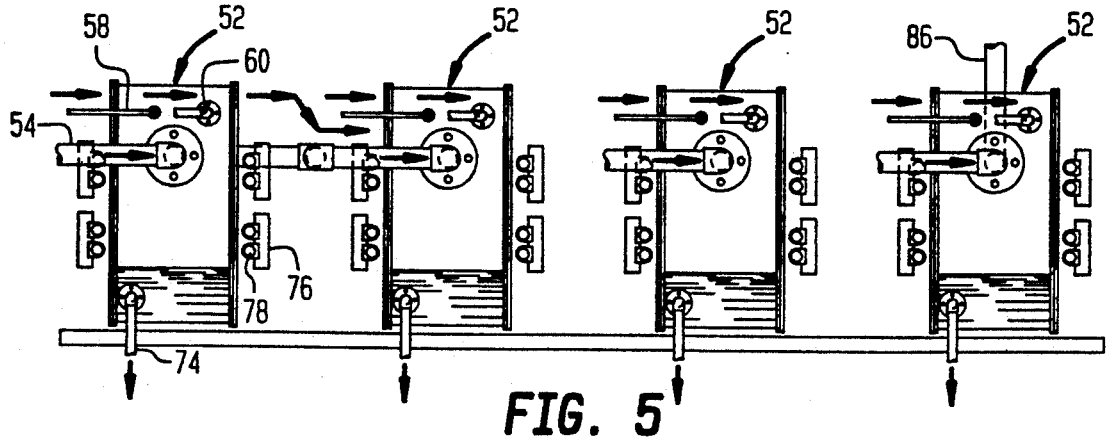
FIG. 5 is an end elevation view of a horizontal series-connected plurality of units shown in FIGS. 3 and 4.

Referring now to FIG. 5, yet another horizontally oriented, series arrangement is there shown which includes a plurality of chambers 52 as previously described. This arrangement shown in FIG. 5 interconnects these chambers 52 whereby the contaminated airstream initially flows into conduit 54, is reacted with the atomized liquid oxidizing agent within the first chamber 52 as previously described, exits therefrom into the second chamber in line and so on, the final purified airstream exiting into the atmosphere through discharge conduit 86. Likewise, compressed air flows through this arrangement in seriatim starting with conduit 58 and the liquid oxidizing agent is also flowed in series through each chamber 52 starting at conduit 60 as previously described. Each chamber 52 includes a lighting fixture 76 and ultraviolet light sources 78 operably connected therewithin as previously described.

Figure 6:
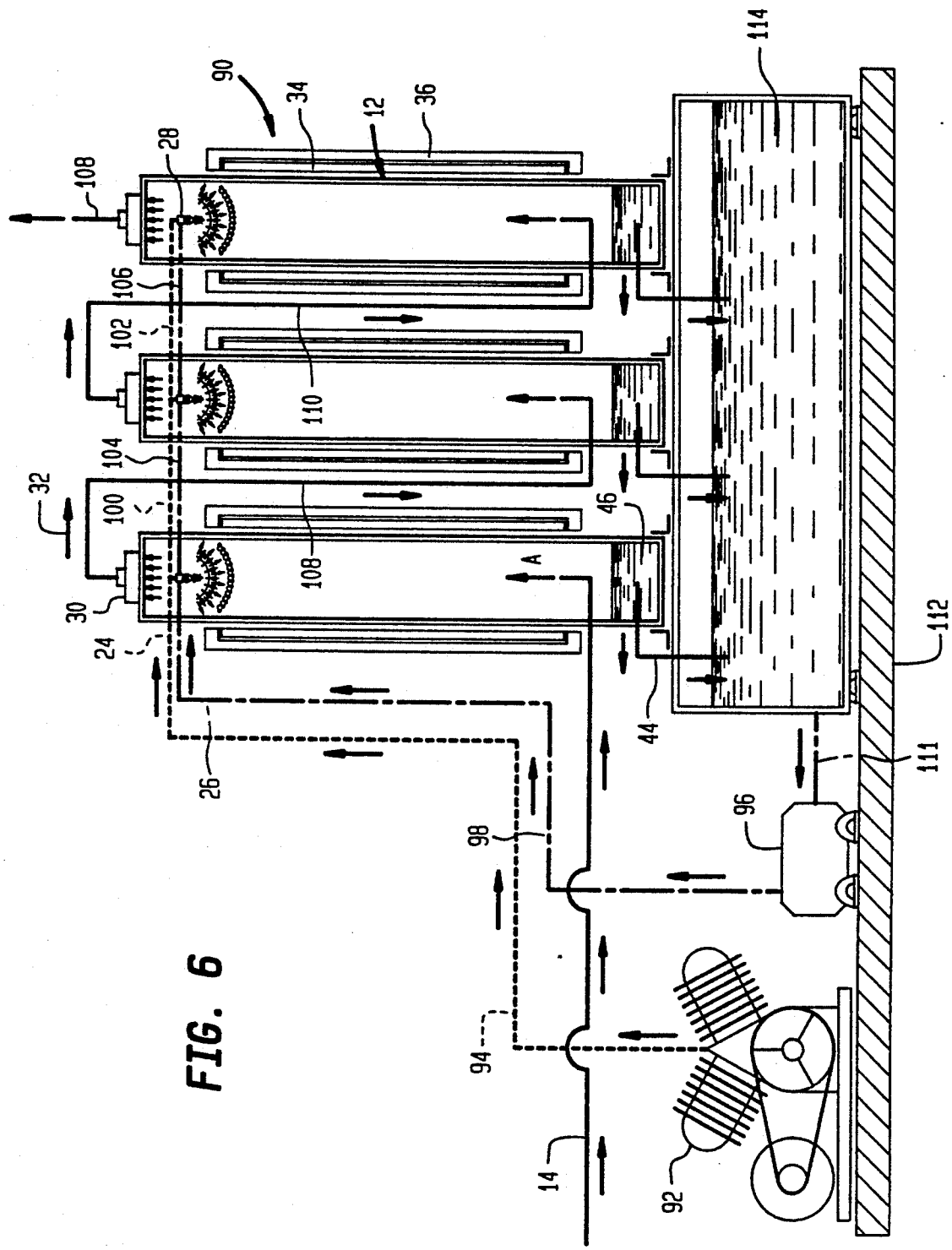
FIG. 6 is a front elevation schematic view of another embodiment of the invention.

Referring now to FIG. 6, yet another embodiment of the invention is there shown at numeral 90. This embodiment 90 includes a plurality of upright chambers 12 as previously described in FIG. 1, these chambers 12 being connected in series to provide for added reduction in hydrocarbons from the contaminated air source entering into the system 90 through conduit 14.

An air compressor 92 supplies a pressurized flow of air into conduit 94, introduced into the system through conduit 24 and then into atomizing nozzle 28 within each chamber 12 as previously described. Separately entering into each atomizing nozzle 28 is a supply of pressurized liquid oxidizing agent supplied by injection pump 96 into conduit 98 and then into conduit 26.

Initial mixing and chemical reaction occurs within the first chamber 12 in series as the fully hydrocarbon-contaminated airstream flows upward in the direction of arrow A. After initial hydrocarbon reduction in the first chamber 52, the partially decontaminated airstream exits through conduit 32 and into the next chamber 12 through conduit 108, then into the last chamber 12 through conduit 110. Finally, the purified airstream exists the system through conduit 108.

Collected at 46 at the bottom of each chamber 52, all excess, unreacted liquid oxidizing agent is collected through drains 44 into a chemical reservoir tank 114 for re-entry into injection pump 96 through conduit 111.

Figure 7:
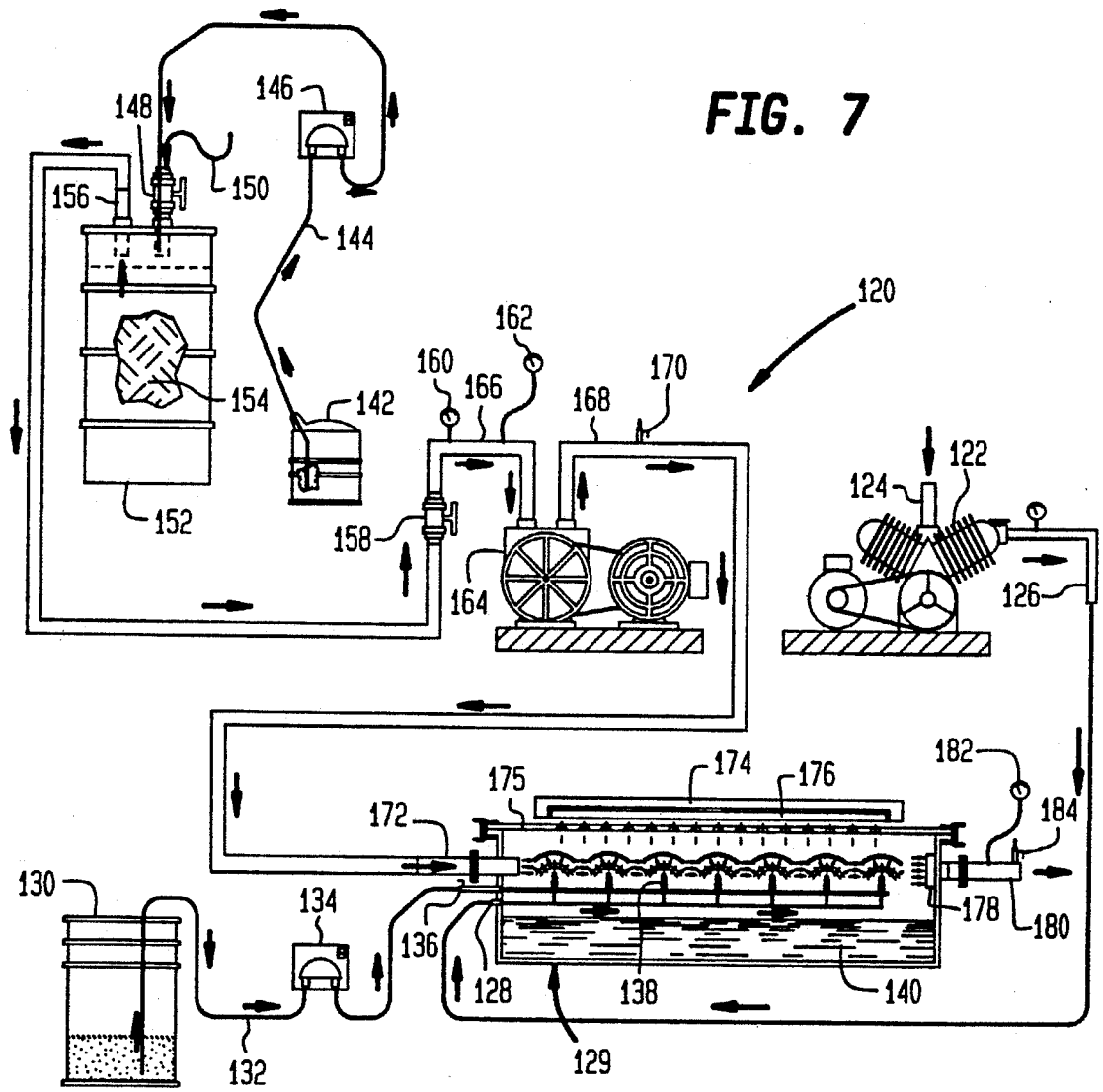
FIG. 7 is a schematic view of a prototype used in the development of the present invention.

Referring lastly to FIG. 7, the prototype system utilized to develop the present invention is there shown generally at numeral 120. This prototype apparatus 120 includes an air compressor 122 which receives fresh air into inlet 124 for discharge through conduit 126 at a regulated pressure. This compressed air supply enters chamber 129 through inlet 128 leading into a plurality of atomizing nozzles 138.

A container 130 filled with hydrogen peroxide ($H_2O_2$) supplies the liquid oxidizing agent into the system through conduit 132 leading into a peristaltic pump 134 and then into inlet 136 leading to each atomizing nozzle 138 for mixing and discharge with the compressed air supply.

A supply of hydrocarbon-contaminated air is produced by drawing gasoline in a liquid form from a gasoline-filled container 142 into a pump 146 which then delivers the liquid gasoline through valve 148 into a 55 gallon drum 152. A fresh air inlet 150 is also included within valve 156 so that a combination of fresh air and liquid gasoline is introduced for mixing and saturation with a quantity of soil 154 within drum 152. Blower 164 is utilized to draw a hydrocarbon-contaminated airstream from drum 152 through outlet 156. Valve 158 is utilized to control airflow into vacuum pump 164 through inlet 166. Contaminated airstream temperature is monitored at 160 and vacuum pressure is monitored at 162.

The contaminated airstream discharges through vacuum pump 164 through outlet 168. Periodic monitoring of the concentration of the contaminated airstream is monitored at sample port 170. This carefully monitored contained airstream is then introduced into the chamber 129 through inlet 172 so that the contaminated airstream travels through and in the midst of the discharge from atomizing nozzles 138 and shown and as previously described.

A transparent panel 175 forms one surface of chamber 129 so that ultraviolet light emitting from ultraviolet light source 176 within fixture 174 impinges upon the atomized mixture within chamber 129.

The chemically reacted airstream containing primarily carbon dioxide and water in vapor form then discharges through demister/vapor separator 178, the outlet 180. A discharge sample port 184 and airflow indicator 182 monitor this discharge from the system 120.

The results of three separate series of tests are shown in Tables I, II and III. The results in Table I depict the baseline performance of the system using only one atomizing nozzle, two separate levels of ultraviolet light and no oxidizing agent except for distilled water. This test indicates that no appreciable reduction in hydrocarbons occurs.

The test depicted in Table II again utilizes only one atomizing nozzle, along with a liquid oxidizing agent of hydrogen peroxide. A lower, 60 watt level of ultraviolet light was utilized. All tests indicated a reduction in total hydrocarbons of 20 parts ppm.

In Table III, a series of six atomizing heads as depicted in Chamber 129 in FIG. 7 was utilized. Again, hydrogen peroxide as a liquid oxidizing agent to be atomized within the chamber 129 was utilized. A higher ultraviolet radiation level of 120 watts input was utilized and as indicated, substantially higher levels of hydrocarbons were removed from the contaminated airstream discharging from the system 120.

TABLE I

| Run | Flow Rate (cfm) | Influent (ppm) | UV (watts) | Atomizing Reagent | Effluent (ppm) | Total Hydrocarbon Removed |
|---|---|---|---|---|---|---|
| 1 | 70 | 340 | 60 | None | 339 | 1 |
| 2 | 70 | 365 | 60 | None | 365 | 0 |
| 3 | 70 | 340 | 120 | None | 340 | 0 |
| 4 | 70 | 365 | 120 | None | 365 | 0 |
| 5 | 70 | 340 | 60 | Distilled Water | 337 | 3 |
| 6 | 70 | 365 | 60 | Distilled Water | 361 | 4 |
| 7 | 70 | 340 | 120 | Water | 338 | 2 |
| 8 | 70 | 365 | 120 | Water | 360 | 5 |

TABLE II

| Run | Flow Rate (cfm) | Influent (ppm) | UV (watts) | Atomizing Reagent | Effluent (ppm) | Total Hydrocarbon Removed |
|---|---|---|---|---|---|---|
| 1 | 100 | 500 | 60 | H2O2 | 480 | 20 |
| 2 | 100 | 455 | 60 | H2O2 | 435 | 20 |
| 3 | 100 | 200 | 60 | H2O2 | 180 | 20 |
| 4 | 50 | 180 | 60 | H2O2 | 160 | 20 |

TABLE III

| Run | Flow Rate (cfm) | Influent (ppm) | UV (watts) | Atomizing Reagent | Effluent (ppm) | Total Hydrocarbon Removed |
|---|---|---|---|---|---|---|
| 1 | 70 | 340 | 120 | H2O2 | 110 | 230 ppm |
| 2 | 70 | 840 | 120 | H2O2 | 310 | 520 ppm |
| 3 | 70 | 220 | 120 | H2O2 | 70 | 150 ppm |

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A method of removing hydrocarbon constituents from a contaminated airstream comprising the steps of:
   A. introducing said airstream into an inlet at one end of an elongated chamber;
   B. simultaneously introducing an atomized air spray into said contaminated airstream through an atomizing nozzle within said chamber, said atomized spray including a liquid oxidizing agent;
   C. simultaneously exposing said contaminated airstream mixed with said atomized spray within said chamber to an ultraviolet light source exterior to, and passing through a transparent panel of, said chamber and allowing at least a portion of said hydrocarbon constituents to become chemically reduced, in combination with said contaminated airstream and said atomized spray, to a purified airstream having reduced hydrocarbon constituents, carbon dioxide ($CO_2$) and water ($H_2O$);
   D. exhausting said purified airstream and said carbon dioxide from another end of said chamber.

2. A method as set forth in claim 1, further comprising the steps of:
   E. collecting said liquid oxidizing agent for recirculation simultaneous with step D.

3. A method as set forth in claim 1, further comprising the steps of:
   E. introducing said purified airstream into an inlet at one end of a second said chamber after step D;
   F. simultaneously introducing a second pressure-atomized air spray into said purified airstream through another said atomizing nozzle within said second chamber, said second atomized spray including a liquid oxidizing agent;
   G. simultaneously exposing said purified airstream mixed with said second atomized spray within said second chamber to a second ultraviolet light source exterior to, and passing through a transparent panel of, said chamber and allowing at least a portion of said hydrocarbon constituents remaining within said purified airstream to become chemically reduced, in combination with said purified airstream and said second atomized spray, to a second purified airstream having further reduced hydrocarbon constituents, carbon dioxide ($CO_2$) and water ($H_2O$);
   H. exhausting said second purified airstream and said carbon dioxide from another end of said second chamber.

4. A method as set forth in claim 3, further comprising the step of:

I. collecting excess said liquid oxidizing agent for recirculation simultaneous with step G.

5. A method as set forth in claim 1, wherein:
said liquid oxidizing agent includes hydrogen peroxide ($H_2O_2$).

6. A method as set forth in claim 1, wherein:
said liquid oxidizing reagent includes ozone ($O_3$).

7. A method as set forth in claim 1, further comprising the steps of:
   E. extracting a contaminated airstream from a quantity of hydrocarbon-contaminated soil prior to step A thereby producing said contaminated airstream.

8. An apparatus for removing hydrocarbon constituents from a contaminated airstream comprising:
   an elongated chamber having an inlet at one end for receiving said contaminated airstream and an outlet at an opposite end of said chamber;
   means for delivering said contaminated airstream into said chamber through said inlet;
   an atomizing nozzle means positioned within said chamber for dispersing an air pressure-atomized vapor including hydrogen peroxide ($H_2O_2$) into the path of said contaminated airstream;
   means exterior to said chamber for emitting ultraviolet light through a transparent panel of, and into said chamber;
   said hydrocarbon contaminants in said contaminated airstream chemically reacting with said atomized hydrogen peroxide in the presence of said ultraviolet light to form carbon dioxide ($CO_2$) and water ($H_2O$) and purified air;
   said purified air and carbon dioxide produced with said chamber exiting said chamber through said outlet.

9. An apparatus as set forth in claim 8, further comprising:
   means for collecting and recirculating excess unreacted hydrogen peroxide ($H_2O_2$) back into said nozzle means.

10. An apparatus for removing hydrocarbon constituents from a contaminated airstream comprising:
    an elongated chamber having a transparent surface, an inlet at one end of said chamber for receiving said contaminated airstream, and an outlet at an opposite end of said chamber;
    blower means for delivering said contaminated airstream into said chamber through said inlet;
    an atomizing nozzle positioned within said chamber connected to a first and second supply conduit;
    means for pumping a liquid oxidizing agent into said nozzle through said first conduit;
    means for pumping a supply of pressurized air into said nozzle through said second conduit;
    said liquid oxidizing agent being discharged in atomized form from said nozzle by said pressurized air supply;
    an ultraviolet light source positioned outside said chamber adjacent said transparent surface, ultraviolet light thereby impinging upon said contaminated airstream within said chamber;
    said atomized discharge being oriented to mix with said contaminated airstream within said chamber whereby said atomized liquid oxidizing agent chemically reacts with said contaminated airstream when exposed to said ultraviolet light to form carbon dioxide ($CO_2$) and water ($H_2O$) and purified air, which discharges from said chamber outlet.

11. An apparatus as set forth in claim 10, further comprising:
    means for collecting and recycling an unreacted portion of said liquid oxidizing agent.

12. An apparatus as set forth in claim 10, wherein:
said liquid oxidizing agent includes hydrogen peroxide ($H_2O_2$).

13. An apparatus as set forth in claim 10, wherein:
said liquid oxidizing reagent includes ozone ($O_3$).

* * * * *